US006688543B2

United States Patent
Oritani

(10) Patent No.: US 6,688,543 B2
(45) Date of Patent: Feb. 10, 2004

(54) HANGER RECYCLING SYSTEM

(75) Inventor: Motoyuki Oritani, 2-9, Hosoda 3-chome, Katsushika-ku, Tokyo (JP)

(73) Assignee: Motoyuki Oritani (JP)

( * ) Notice: Subject to any disclaimer, the term of this patent is extended or adjusted under 35 U.S.C. 154(b) by 97 days.

(21) Appl. No.: 09/766,974

(22) Filed: Jan. 23, 2001

(65) Prior Publication Data

US 2001/0010118 A1 Aug. 2, 2001

(30) Foreign Application Priority Data

Jan. 28, 2000  (JP) ........................................ 2000-020252

(51) Int. Cl.[7] .............................................. B02C 19/12
(52) U.S. Cl. ........................................... 241/30; 241/99
(58) Field of Search ........................... 264/37.1; 241/30, 241/301, 99

(56) References Cited

U.S. PATENT DOCUMENTS 5,785,260 A  *  7/1998 Morgan .................... 241/24.28

FOREIGN PATENT DOCUMENTS

| FR | 2735042 | * | 12/1996 |
| FR | 2779630 | * | 12/1999 |
| JP | 4-229210 |   | 8/1992 |
| JP | 5-57270 |   | 3/1993 |
| JP | 09-267332 |   | 10/1997 |

* cited by examiner

*Primary Examiner*—Mark Rosenbaum
(74) *Attorney, Agent, or Firm*—Burns, Doane, Swecker & Mathis, LLP

(57) ABSTRACT

The present invention provides a hanger recycling system that enables effective use of resources, such that PET bottles and hangers are not disposed of as waste, but rather can be reutilized. Thus, this system is useful in reducing waste and limiting the generation of dioxane, and enables the recycling system to be easily established. The system is easily introduced to various areas, benefits regional development, and enables recycled hangers to be collected efficiently and economically with little burden. This system is designed such that used PET bottles are supplied to a hanger manufacturer (B) by collectors (A); the recycled hangers manufactured by the manufacturer (B) are supplied to providers (C); the recycled hangers supplied to the providers (C) are provided to the users (D); the recycled hangers no longer needed by the users (D) are sent to the providers (C); the recycled hangers not needed by the users (D) or the providers (C) are sent to the manufacturer (B) once a certain amount have accumulated; and these recycled hangers are then reutilized as raw material for new hangers.

3 Claims, 1 Drawing Sheet

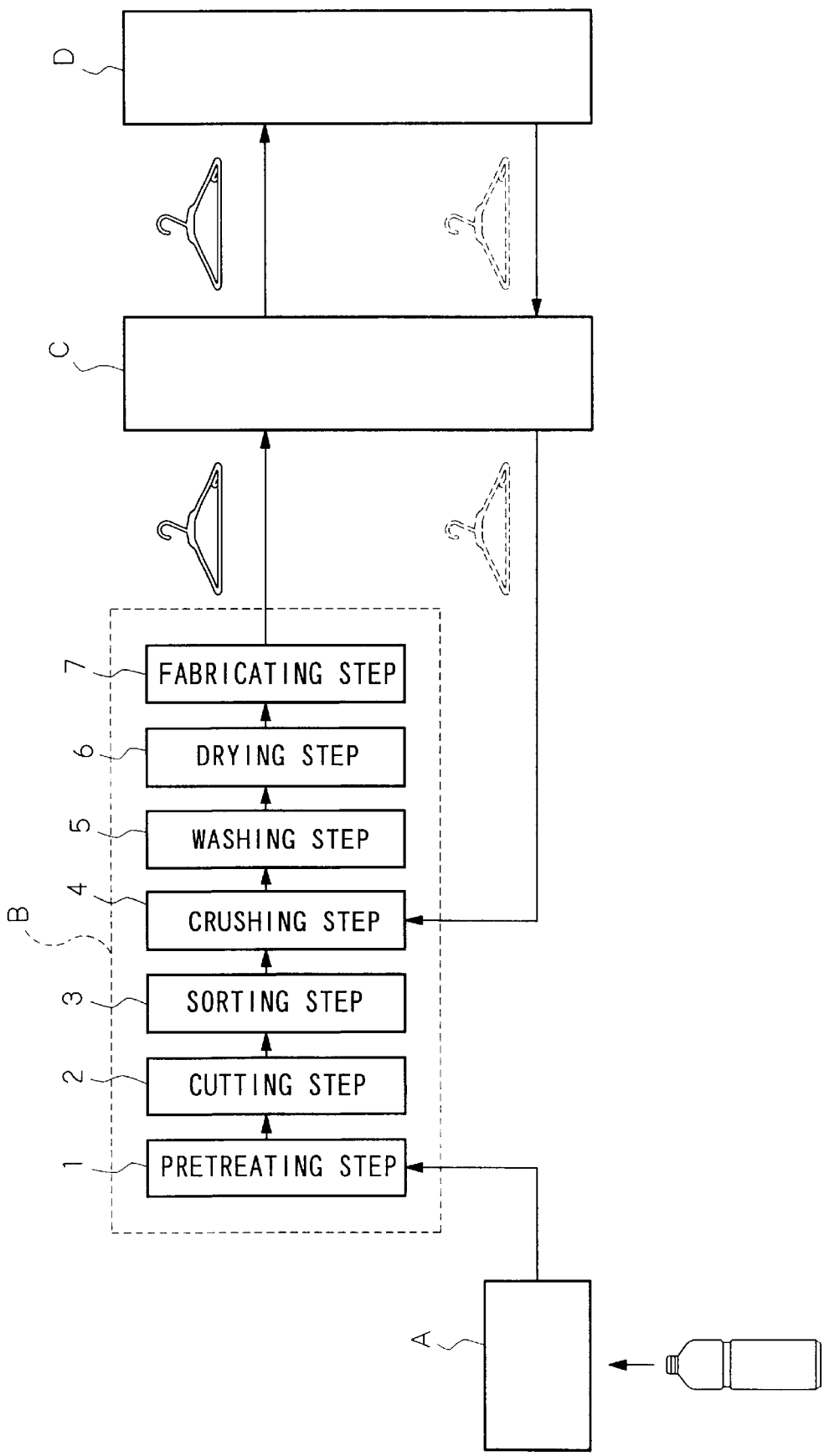

HANGER RECYCLING SYSTEM

This application claims priority under 35 U.S.C. §§119 and/or 365 to 2000-020252 filed in Japan on Jan. 28, 2000; the entire content of which is hereby incorporated by reference.

BACKGROUND OF THE INVENTION

1. Field of the Invention

The present invention relates to a hanger recycling system for forming recycled hangers from a thermoplastic polyester resin material that employs used PET bottles as the raw material, wherein these recycled hangers are not disposed of as refuse, but rather can themselves be readily reutilized as raw material for new recycled hangers.

2. Description of the Related Art

Conventional synthetic resin hangers are often formed of polyethylene, polypropylene or the like. Once dirty, damaged or no longer needed, these hangers are frequently discarded as refuse.

At the same time, serious investigation has been directed to reutilizing used PET bottles with an eye toward decreasing garbage waste.

A large number of synthetic resin hangers which are provided by dry-cleaning stores, etc., to customers are frequently discarded as refuse, however. Similarly, only a portion of used PET bottles are actually recycled. Thus, a sufficient solution has not been achieved.

SUMMARY OF THE INVENTION

Accordingly, the present invention was conceived with the goal of more effectively utilizing used PET bottles as a resource and reducing waste by linking together reutilization of the used PET bottles with hangers, large numbers of which until now have been disposed of as refuse. Namely, the present invention provides a recycling system for hangers formed of a thermoplastic polyester resin material in which the used PET bottles are employed as the raw material for the hangers, and are supplied to a hanger manufacturer from PET bottle collectors such as supermarkets, waste incineration plants, and autonomous agencies. Recycled hangers are manufactured by the manufacturer and supplied to such hanger providers as dry-cleaning stores and apparel makers. The recycled hangers supplied to the providers are provided to such hanger users as department stores and consumers. At the same time, the recycled hangers that become dirty, damaged or are no longer needed by the users are sent to the providers. Once the recycled hangers from the users, as well as the recycled hangers that become dirty, damaged or are no longer needed at the providers, have accumulated to a certain degree, the providers sends them to the manufacturer. These recycled hangers are then reutilized as raw material for new hangers.

The hanger recycling system can employ a means wherein, at the hanger manufacturer, the used PET bottles employed as raw material for the hangers are subjected to a pretreating step, a cutting step, a sorting step, a crushing step, a washing step, a drying step and a fabricating step, to form the recycled hangers, and the recycled hangers sent from the providers to the manufacturer to be used as raw material for new hangers are subjected to the crushing step, the washing step, the drying step and the fabricating step, to form recycled hangers.

Furthermore, the hanger recycling system can employ a means wherein the operations of removing the cap and peeling off the label from the used PET bottles are performed in the pretreating step; the operations of cutting off the mouth portion of the PET bottle and primary cutting of the remainder of the PET bottle are performed in the cutting step; the severed mouth portions are removing in the sorting step; the remainder of the primary cut PET bottles are finely crushed in the crushing step; the crushed pieces are degreased, and washed with water and warm water in the washing step; the warm-water washed crushed pieces are dried in the drying step; and the dried crushed pieces are used to fabricate recycled hangers in the fabricating step.

BRIEF DESCRIPTION OF THE FIGURES

FIG. 1 is a schematic diagram explaining an example of the hanger recycling system of the present invention.

PREFERRED EMBODIMENTS OF THE PRESENT INVENTION

The present invention will now be explained based on the example in the FIGURE.

The present invention is a hanger recycling system for forming recycled hangers utilizing a thermoplastic polyester resin (polyethylene terephthalate hereinafter) that employs used PET bottles as the starting material, and, further, which enables the recycled hangers themselves to be smoothly reutilized as raw material for new hangers, rather than being discarded as refuse.

In this hanger recycling system, super markets, waste incineration plants, and autonomous agencies are designated as collectors A, which collect the used PET bottles that serve as the system's raw material; hanger fabricating plants are designated as a manufacturer B, which manufacture the recycled hangers using a thermoplastic polyester resin (such as polyethylene terephthalate, for example); dry-cleaning stores and apparel manufacturers are designated as providers C, which supplied with the recycled hangers by the manufacturer B; and department stores and consumers are designated as users D, which are provided with the recycled hangers by the providers C.

The used PET bottles are collected by the collectors A (or are brought to collector A's location), and are supplied by the collectors A to the manufacture. The recycled hangers are manufactured from the used PET bottles by the manufacturer B and supplied to the providers C. The recycled hangers are then provided by the providers C to the users D.

In addition, the recycled hangers which become dirty, damaged or are not needed by the users D are sent to the providers C. The providers C keeps these recycled hangers from the users D, as well as dirty, damaged or unneeded hangers generated in its own operation. Once these hangers have accumulated to a certain degree, the providers C sends them to the manufacturer B. These hangers are then reutilized by the manufacturer B as raw material for new hangers. In other words, a circulating recycling system that generates no waste is achieved (see FIG. 1).

It is desirable to carry out the supply of recycled hangers from the manufacturer B to the providers C, and the relay of dirty, damaged or unneeded recycled hangers from the providers C to the manufacture B, using a suitable returnable container. By using the returnable container, relay of the accumulated dirty, damaged or unneeded hangers from the providers C to the manufacture B is facilitated, and recycling costs are reduced because the supply and relay of the hangers are can economically be performed.

The manufacturer B employs a pretreating step 1, a cutting step 2, a sorting step 3, a crushing step 4, a washing step 5, a drying step 6 and a fabricating step 7, and subjects the used PET bottles employed as raw material to these processes to form recycled hangers. In other words, the preceding design makes it possible to employ any used PET bottle, regardless of how dirty it is, as the raw material for the recycled hangers, and to anticipate its processing with confidence. In addition, recycled hangers sent from the providers C are reutilized as raw material with good efficiency.

In addition, recycled hangers sent from providers C to Manufacturer B to be used as raw material for new hangers are subjected to the crushing step 4, the washing step 5, the drying step 6 and the fabricating step 7, to form newly recycled hangers. In other words, the recycled hangers sent from the providers C are reutilized as raw material with good efficiency by omitting them from the pretreating step 1, the cutting step 2, and the sending step 3.

In the pretreating step 1, for example, the cap is removed and the label is peeled from the surface of the used PET bottle.

In the cutting step 2, a suitable cutting device is employed to cut off the mouth portion of the PET bottle and carry out primary cutting of the remainder of the bottle. Note that the primary cutting in this cutting step 2 may be carried out using a press machine in the case of small PET bottles.

In the sorting step 3, a suitable sorting means is employed to remove the severed mouth portions of the bottles, and collect the remainder of the primary cut PET bottles.

In the crushing step 4, a suitable crushing means is used to more finely crush (secondary cutting) the remainder of the primary cut PET bottles (into 8 mm or smaller square crushed pieces, for example).

In the washing step 5, the crushed pieces are degreased, and washed with water and warm water. Ortho•silica soda, caustic soda, or a surface active agent may be used to degrease the crushed pieces.

In the drying step 6, the warm-water washed crushed pieces are dried using warm air blow drying at a temperature of 200° C., for example.

In the fabricating step 7, the dried crushed pieces are heated and formed into recycled hangers in a molding device.

The recycled hangers formed using a thermoplastic polyester resin (polyethylene terephthalate, for example) are formed without a thick portion and so as to have a large surface area. In other words, a rapid rate of polymerization and a high degree of polymerization are employed for the thermoplastic polyester resin when molding the recycled hangers, so that the strength and pliability required of the hangers can be achieved. In addition, the recycled hangers may be the usual type used for jackets or shirts, or may be skirt hangers, tie hangers or other suitable hangers. In addition, it is also acceptable to form the hook portion of the hanger out of a metal material that can be freely released from the main part of the hanger.

Note that the collectors A may be any type of organization or business. The manufacturer B may be any type of business, and the processing steps may be suitably divided between manufacturers. Finally, the providers C and the users D may be any type of business, store, or consumer.

In addition, the specific details of and executing means employed in the pretreating step 1, the cutting step 2, the sorting step 3, the crushing step 4, the washing step 5, the drying step 6 and the fabricating step 7 may be freely and optimally set and varied.

In the hanger recycling system of the present invention, the used PET bottles are not disposed of as waste, but can be reutilized as the recycled hangers thereby making effective use of them. In addition, the recycled hangers that have become dirty, damaged or no longer needed are not disposed of as waste, but can also be reutilized as the recycled hangers, thereby making effective use of resources. Thus, an ideal hanger recycling system that is beneficial to the problem of waste reduction can be achieved. Moreover, this system makes it possible to reduce at least to some extent the generation of dioxane.

Note that this recycling system can be easily established provided that there is the collectors A, the manufacturer B, the providers C and the users D. Further, this recycling system can be readily introduced into various areas and is beneficial to regional development.

In particular, the recycled hangers that become dirty, damaged or are no longer needed by the users D are sent to the providers C. Once the recycled hangers from the users D, as well as the recycled hangers that become dirty, damaged or are no longer needed at the providers C, have accumulated to a certain degree, the providers C sends them to the manufacturer B. These recycled hangers are then reutilized as raw material for the new hangers. As a result, the users D can easily send these dirty, damaged or unneeded recycled hangers to the providers C, and the providers C can easily send these dirty, damaged or unneeded recycled hangers to the manufacturer B. Thus, these dirty, damaged or unneeded recycled hangers can be collected while reducing the burden on the users D, the providers C and the manufacturer B, and can be collected with good efficiency.

In addition, since the providers C can send these dirty, damaged and unneeded recycled hangers to the manufacturer B once they have accumulated to a certain extent, a returnable container is easily employed and a more economical relay of the hangers is made possible. Thus, this is beneficial in reducing recycling costs.

What is claimed:

1. A method for recycling hangers formed of a thermoplastic polyester resin material, the method comprising:

a step of manufacturing recycled hangers by a hanger manufacturer employing used PET bottles which are supplied to said hanger manufacturer by PET bottle collectors as a raw material for new hangers;

a step of supplying said recycled hangers to hanger providers;

a step of providing said recycled hangers which were supplied to said hanger providers to users;

a step of sending said recycled hangers that become dirty, damaged or are no longer needed by said users to said hanger providers;

a step of sending said recycled hangers that become dirty, damaged or are no longer needed and were sent to said hanger providers, to said hanger manufacturer once a certain amount have accumulated; and a step of reutilizing said recycled hangers that were sent to said hanger manufacturer as the raw material for new hangers.

2. A method for recycling hangers according to claim 1, wherein at said hanger manufacturer, said used PET bottles employed as the raw material for new hangers are subjected to a pretreating step, a cutting step, a sorting step, a crushing step, a washing step, a drying step and a fabricating step, to form said recycled hangers, and said recycled hangers sent from said hanger providers to said hanger manufacturer to be used as the raw material for new hangers are subjected to the crushing step, the washing step, the drying step and the fabricating step, to form said recycled hangers.

3. A method for recycling hangers according to claim 2, wherein operations of removing caps and peeling off labels from said used PET bottles are performed in said pretreating step; operations of cutting off mouth portions of said PET bottles and primary cutting of remainders of said PET bottles are performed in said cutting step; the severed mouth portions are removed in said sorting step; the remainder of the primary cut PET bottles are finely crushed in said crushing step; the crushed pieces are degreased, and washed with water and warm water in said washing step; the warm-water washed crushed pieces are dried in said drying step; and the dried crushed pieces are used to fabricate said recycled hangers in said fabricating step.

* * * * *